United States Patent
Bronstein

(10) Patent No.: US 7,643,682 B2
(45) Date of Patent: Jan. 5, 2010

(54) METHOD OF IDENTIFYING REDUNDANT TEXT IN AN ELECTRONIC DOCUMENT

(75) Inventor: Serge Bronstein, Raanana (IL)

(73) Assignee: PDFlib GmbH (DE)

( * ) Notice: Subject to any disclaimer, the term of this patent is extended or adjusted under 35 U.S.C. 154(b) by 739 days.

(21) Appl. No.: 11/405,771

(22) Filed: Apr. 18, 2006

(65) Prior Publication Data

US 2006/0282769 A1 Dec. 14, 2006

(30) Foreign Application Priority Data

Jun. 9, 2005 (EP) .................................. 05012452

(51) Int. Cl.
G06K 9/34 (2006.01)
(52) U.S. Cl. ...................................... 382/180
(58) Field of Classification Search ................. 382/173, 382/176–180, 181, 209, 226–230, 305–306; 235/456, 487, 494
See application file for complete search history.

(56) References Cited

U.S. PATENT DOCUMENTS 5,168,147 A * 12/1992 Bloomberg ................. 235/456
5,321,773 A * 6/1994 Kopec et al. ................. 382/209
6,641,053 B1 * 11/2003 Breidenbach et al. ....... 235/494

OTHER PUBLICATIONS

European Search Report for Parent Application Serial No. EP 05 01 2452, Dated Nov. 2, 2005 (1 Page).

Anonymous: "Users guide for PDFConverterX" Feb. 15, 2005, XP002352093 Retrieved from the Internet: URL: <http//www/softinterface.com/PDFX/Documentation/Default.htm>.
Anonymous: "SII PDF Interface (PDFConverterX API Interface)" Web Archive Internet Publication, Apr. 14, 2004, XP002352094, Retrieved from the Internet: URL: <http//web.archive.org/web/20040414024953/www.softinterface.com/PDFX/pdhf.pdf>.
Anonymous: "Convert PDF to Text Component 1-8/DLL"Web Archive Internet Publication, Jun. 18, 2004, XP002352095, Retrieved from the Internet: URL: <http://web/archive.org/web/20040618200605/www.softinterface.com/PDFX/Convert-PDF-To-Text-Component.HTM>.

* cited by examiner

Primary Examiner—Jose L Couso
(74) Attorney, Agent, or Firm—Jansson Shupe & Munger Ltd.

(57) ABSTRACT

A method of identifying redundant text fragments, which create artificial artifacts only, in an electronic page description language document includes a) providing a page having a plurality of text fragments, each text fragment comprising at least one glyph, the document including Unicode values for all glyphs and geometric information of all text fragments on the page and page description language parameters of all glyphs, b) identifying two text fragments as redundant candidates, if the Unicode sequence of the text fragments have identical corresponding Unicode sequences, c) defining a bounding box of quadrangular shape for each of the two redundant candidates according to their font characteristics, d) calculating the overlapping area of the two bounding boxes, and e) determining whether the two candidates form redundant text fragments by comparing the ratio of the overlapping area to the area of the smaller bounding box of both text fragments with a predetermined threshold.

7 Claims, 2 Drawing Sheets

METHOD OF IDENTIFYING REDUNDANT TEXT IN AN ELECTRONIC DOCUMENT

CROSS REFERENCE TO RELATED APPLICATION

Figure 1:
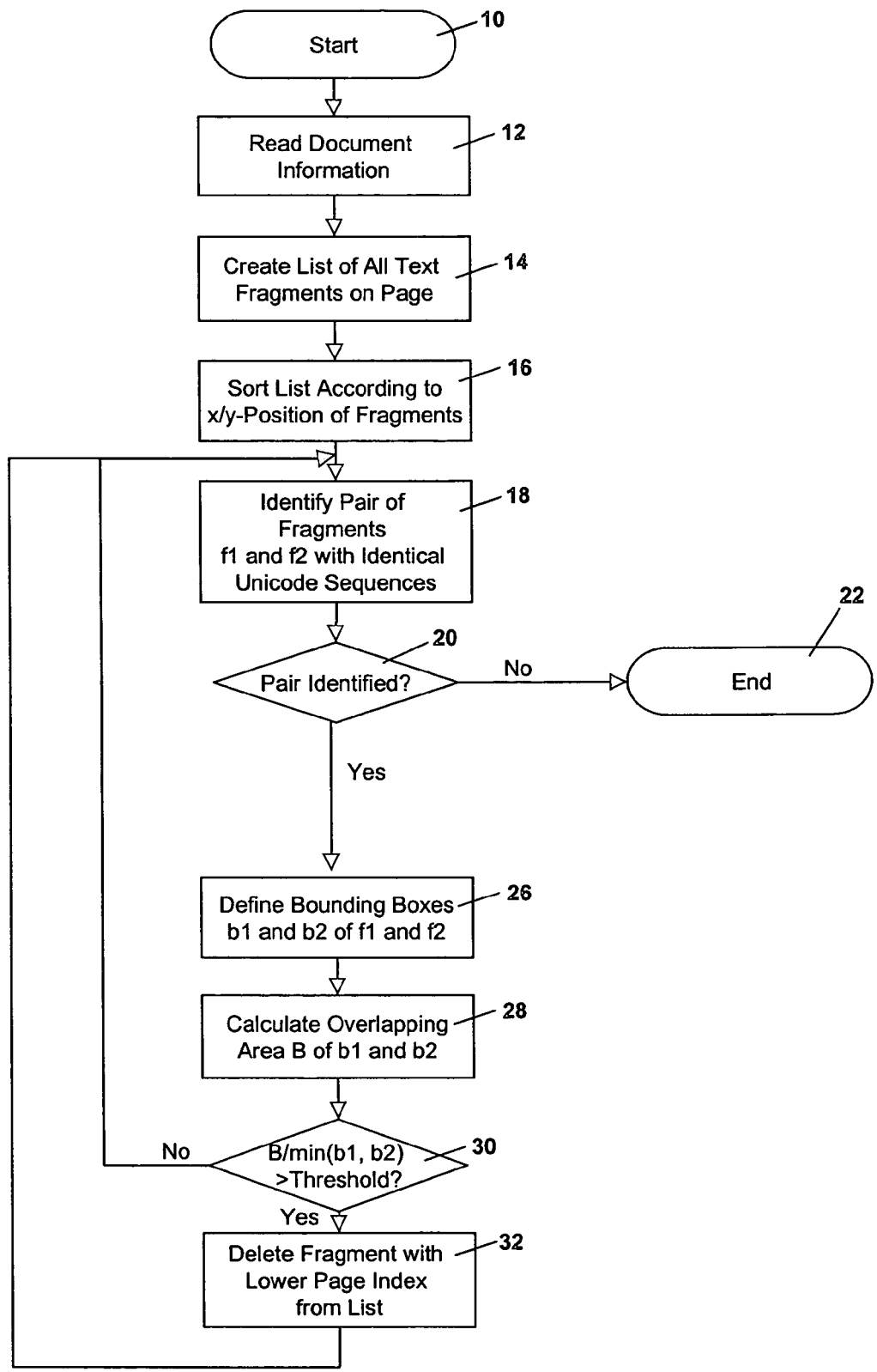

This application claims the benefit under 35 U.S.C. §119 of European application EP 05 012 452.8, filed Jun. 9, 2005.

FIELD OF THE INVENTION

The present invention relates to a method of identifying redundant text in an electronic document and, more particularly, to a method of identifying redundant text in a document described in a page description language.

BACKGROUND OF THE INVENTION

In addition to producing physical renderings of digital documents (e.g. paper prints), exchanging and archiving the digital documents themselves plays an increasing role in business as well as private communications. In order to facilitate exchange and provide universal access regardless of computer system and application, general page description languages are used instead of native word processor formats for exchanging digital documents. In order to reuse the text content of digital documents for archiving, indexing, searching, editing, and other purposes not related to producing a visual rendering of the page, it is desirable to identify the logical (reading) order, the semantic units (words of natural languages) and the correct semantics of the text.

Digital documents described in page description languages, such as the Portable Document Format (PDF), PostScript, and PCL, sometimes include redundant text which does not contribute to the semantics of a page, but creates certain visual effects only. Shadow text effects are usually achieved by placing two or more copies of the actual (semantic) text on top of each other, where a small displacement is applied. Applying opaque coloring to each layer of text provides a visual appearance where the majority of the text in lower layers is obscured, while the visible remainders create a shadow effect.

Similarly, word processing applications sometimes support a feature for creating artificial bold text. In order to create bold text appearance even if a bold font is not available, the text is placed repeatedly on the page in the same color. By using a very small displacement (relative to the font size), a bold text appearance is simulated.

Shadow simulation, artificial bold text, and similar visual artifacts create severe problems when the text contents are not only visually rendered, but must be reused, e.g., for searching or editing the text. The redundant text contents which contribute only to the visual appearance severely impact such applications since redundant text will be processed which does not semantically belong to the page contents.

It is an object of the present invention to provide a method of identifying fragments of text in digital documents which do not contribute to the semantics of a page, but which create visual artifacts only. Removing such redundant fragments enhances the accuracy of all processes which rely on the text semantics, such as searching, editing, or converting to other formats.

SUMMARY OF THE INVENTION

As used herein, the term "redundant text fragment" is defined as text type information that creates artificial artifacts only. The "term page description language parameter" is defined to include any parameter such as font size, character spacing, and text distortion of all glyphs. The known Unicode standard is employed and is described in further detail below.

According to one aspect of the invention, a method of identifying redundant text fragments in an electronic document, includes: providing an electronic document being described in a page description language, the document including at least one page having a plurality of text fragments, each text fragment including at least one glyph, the document further including Unicode values for all glyphs as well as geometric information including position and width of all text fragments on the page and at least one page description language parameter that is one of font size, character spacing, and text distortion of all glyphs; identifying two text fragments as redundant candidates, if the Unicode sequence of the first text fragment is identical with the corresponding Unicode sequence of the second text fragment; defining a bounding box of quadrangular shape for each of the two redundant candidates according to their font characteristics wherein the height of the bounding box is essentially equal to the font size of the first glyph in the text fragment, and wherein the width of the bounding box is essentially equal to the accumulated widths of all glyphs in the text fragment; calculating the overlapping area of the two bounding boxes; and, determining whether the two candidates form redundant text fragments wherein a ratio of the overlapping area to the area of the smaller bounding box of both text fragments is calculated and the ratio is compared with a predetermined threshold.

BRIEF DESCRIPTION OF THE DRAWINGS FIGURES

Figure 2:
Figure 3:
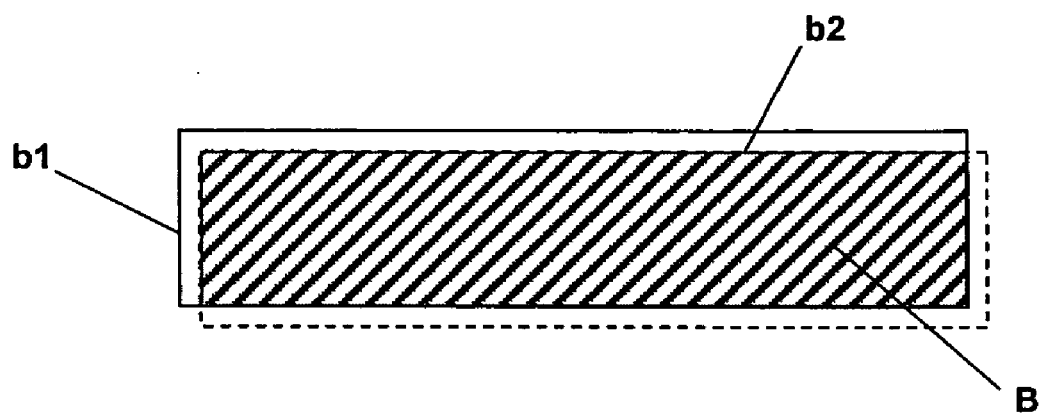

Further details, features and advantages of the present invention will be apparent with reference to the following description and the enclosed drawings, in which:

FIG. 1 shows a flow diagram of the method according to one embodiment of the present invention;

FIG. 2 schematically illustrates two shadow candidate text fragments being identified according to an embodiment of the invention; and FIG. 3 schematically illustrates two bounding boxes corresponding to the text fragments shown in FIG. 2.

DETAILED DESCRIPTION OF PREFERRED EMBODIMENTS

FIG. 1 illustrates in detail the procedural flow according to one embodiment of the present invention. Step 10 is a start of a flow of the method of identifying redundant text in digital documents. In step 12 the document information of an electronic document being described in a page description language is read in. The document can be of any size having a plurality of pages. In particular it is assumed that the following information is available for each glyph in the document: the corresponding Unicode value and geometric information including the glyph's position on the page and the parameters of the page description language such as font size, character spacing, text distortion, etc.

The "Unicode" standard is a character coding system synchronized with ISO/IEC 10646, and is designed to support the worldwide interchange, processing, and display of the written texts of diverse languages and technical disciplines of the modern world. It supports classical and historical text of many written languages. More details can be found on the Unicode web pages under http://www.unicode.org.

Some of the more recent documents described in page description languages provide for the Unicode values and the geometric information mentioned above. However, there are still many documents from which the Unicode values are not easily derivable. Obtaining this information for every page description language document is subject to various studies, and up to now more and more sophisticated solutions for a derivation problem have been provided. The present invention is not directed to this problem, but rather makes use of Unicode information obtained by any suitable method known to an ordinarily skilled person in the art, and it is explicitly assumed that the above mentioned information is available to execute a method according to the invention.

Based on the read information, the method creates in step 14 a list of all text fragments on the page which is currently being processed. The list contains the position corresponding to each text fragment, i.e. their coordinates, according to the page description.

A "text fragment" in the context of the present invention can be any combination of characters, a single glyph, a syllable, and even one or more words. It is particularly noted that a text fragment according to this terminology can be, but is not necessarily identical with a text unit in the page description language which is, for example, a sequence of characters subjected to one command in PDF, such as "(hello you) Tj", wherein "hello you" is the text unit, and "Tj" is the display command for the text unit. Likewise, it is possible to obtain information for every single glyph "h", "e", "l", "l", "o", " ", "y", "o", "u", or for ever word in the text unit ("hello", "you") by means of calculation based on font size, character spacing etc.

The next step 16 is an optional step of the sorting of the list according to the x/y position of the listed text fragments. In principle, executing step 16 enhances the yield, as the overall speed of the method may be increased. Sorting the text fragments can, for instance, refer to the sorting of glyphs, syllables or words.

In the following example, a sorting of text fragments according to their x/y position on the page is described. First, the text fragments are sorted according to their y-position, i.e., the vertical distance from the top of the page. The comparison of the y-values is not performed exactly but with a predefined tolerance. An exemplary tolerance value is the half of the minimum of the bounding boxes (see below) of two text fragments in comparison. In this case, the determination of the bounding box (step 26) has to be performed for every text fragment before sorting them. With this tolerance, superscript and subscript characters or the like can be handled more accurately. Text fragments with (nearly) identical y-positions may be additionally sorted according to their x-position.

In the next step 18, a pair of fragments f1 and f2 with identical parameters from the list is identified. A text fragment is considered identical with another text fragment if the corresponding Unicode values of both text fragments are identical. This step is usually initiated at the top of the list created in step 14 and optionally sorted in step 16. If the text fragments have already been sorted in step 16, only a significantly reduced number of consecutive text fragments (down to only two consecutive text fragments depending on the sorting algorithm) in the list have to be considered so as to diminish computing time and to speed up the calculating operation.

Step 20 includes a decision of whether a pair of redundant candidates has been identified. If the result of step 20 is "no," then the method jumps to step 22 which is the end of the procedural flow in this example. This means that no redundant text, which creates visual artifacts only, has been identified on the processed page. If the result of step 20 is a determination that a pair of possibly redundant text fragments f1 and f2 (redundant candidates) has been identified, the method advances to steps 26 to 30. It is determined whether the pair of possibly redundant text fragments is actually a shadow sequence or another artifact.

In order to achieve this determination, a bounding box of each text fragment is calculated in step 26. The "bounding box" is a quadrangle which is placed at the origin of the first glyph of the text fragment. If the text fragment only contains a single glyph, the height of the bounding box is determined to be the font height of this glyph. Otherwise, the height of the bounding box is equal to the most frequent font height in the text fragment. This eliminates deteriorating influences of subscripts or superscripts. The width of the bounding box is equal to the accumulated widths of all glyphs in this sequence, taking into account all relevant text state parameters such as horizontal scaling and character spacing.

In the following step 28, the overlapping area B of the two bounding boxes b1 and b2 is calculated. The overlapping area can also be described as the intersection of the bounding boxes of both text fragments.

In a following step 30, a ratio of the overlapping area to the minimum of the areas of the two bounding boxes, i.e., the bigger to the smaller one, is calculated. Then it is determined, whether the calculated ratio is larger than a predefined threshold value. This threshold is called the shadow percentage and is described in more detail below.

If the result of step 30 is a determination that the shadow percentage is larger than the predetermined threshold, then the text fragment (f1 or f2) with the lower page index is deleted from the list of all text fragments on the page which was created in step 14. The page index is determined by the order in which the text fragments are cited on a page based on the original page description, i.e., prior to any processing steps. The higher the page index, the closer the corresponding text fragment is to the end of the original page description. Thus, a lower page index means that the corresponding text fragment has been cited earlier on the page compared with another text fragment. According to the so-called "painter's model," text portions cited (and thus placed/printed) later cover text portions cited (and thus placed/printed) earlier. Since all page description languages operate according to the "painter's model," in the context of the present invention the text fragment cited last is always considered the "original," and earlier text fragments that have been identified as shadow sequences are obviously overlapped by the later text fragment and are therefore deleted from the page. Subsequently the method continues in loop with step 18, and another pair of redundant candidates is searched for. If the result of step 30 is that the calculated ratio is equal or smaller than the predetermined threshold then the method also reverts back to step 18.

FIG. 2 shows two text fragments f1 and f2 of the word "Shadow" together with the surrounding bounding boxes b1 and b2, respectively. The height of the font usually includes ascenders and descenders so that the bounding box starting from the baseline is higher than the highest glyph of the text fragment. However, this is irrelevant when calculating the ratio of the two bounding boxes considering that a height deviation in both text fragments does not alter the result. It is to be noted that the illustration of FIG. 2 is for exemplary reasons only, in particular it is not to scale.

FIG. 3 shows the two bounding boxes b1 and b2 of FIG. 2, the overlapping area of these two bounding boxes being hatched and referenced by B.

Empirically, a range extending from 0.5 to 0.7 for the threshold value of the shadow percentage has proven good results. Preferably the value lies in the range between 0.55 and 0.65. Using different threshold values for single-glyph and multi-glyph text fragments generally will improve the accuracy of the shadow detection algorithm.

As described above, the text fragment with the higher page index, of the pair of text fragments that have been identified as redundant, will be kept.

According to an exemplary embodiment of the invention, it may be especially preferable to identify and compare as text fragments whole words as well as single glyphs in a two-step operating sequence, which keeps the computing time relatively short while ensuring extremely reliable results.

It is to be understood that the present invention can be implemented in various forms of hardware, software, firmware, special purpose processes, or a combination thereof. In one embodiment, the present invention can be implemented in software as an application program tangibly embodied on a computer readable program storage device. The application program representing the method according to the invention can be uploaded to, and executed by, a machine having any suitable architecture.

Given the teachings of the present invention provided herein, one of ordinary skill in the related art will be able to contemplate these and similar implementations or configurations of the present invention.

What is claimed is:

1. A method of identifying redundant text fragments, which create artificial artifacts only, in an electronic document, comprising: operating a computer to carry out the following steps
    a) providing an electronic document being described in a page description language, the document comprising at least one page having a plurality of text fragments, each text fragment comprising at least one glyph, the document further comprising Unicode values for all glyphs as well as geometric information including position and width of all text fragments on the page and page description language parameters of all glyphs that include at least one of font size, character spacing, and text distortion;
    b) identifying two text fragments as redundant candidates, if corresponding Unicode sequences of the two text fragments are identical;
    c) defining a bounding box of quadrangular shape for each of the two redundant candidates according to their font characteristics wherein the height of the bounding box is essentially equal to the font size of the first glyph in a text fragment, and wherein the width of the bounding box is essentially equal to the accumulated widths of all glyphs in the text fragment;
    d) calculating the overlapping area of the two bounding boxes; and
    e) determining whether the two candidates form redundant text fragments wherein a ratio of the overlapping area to the area of the smaller bounding box of both text fragments is calculated and the ratio is compared with a predetermined threshold.

2. The method of identifying redundant text fragments according to claim 1, further comprising sorting the text fragments on the page according to their x/y position.

3. The method of identifying redundant text fragments according to claim 1, wherein the predetermined threshold is between 0.5 and 0.7.

4. The method of identifying redundant text fragments according to claim 3, wherein the predetermined threshold is between 0.55 and 0.65.

5. The method of identifying redundant text fragments according to claim 1, further comprising discarding one of the two redundant text fragments for further text processing steps.

6. The method of identifying redundant text fragments according to claim 5 wherein the discarded redundant text fragment has a lower page index according to an original page description.

7. A program storage device readable by a computer, tangibly embodying a program of instructions executable by the computer to perform an operation of identifying redundant text fragments in an electronic document, the operation comprising the steps of:
    a) providing an electronic document being described in a page description language, the document comprising at least one page having a plurality of text fragments, each text fragment comprising at least one glyph, the document further comprising Unicode values for all glyphs as well as geometric information including position and width of all text fragments on the page and page description language parameters of all glyphs that include at least one of font size, character spacing, and text distortion;
    b) identifying two text fragments as redundant candidates, if corresponding Unicode sequences of the two text fragments are identical;
    c) defining a bounding box of quadrangular shape for each of the two redundant candidates according to their font characteristics wherein a height of the bounding box is essentially equal to the font size of the first glyph in the text fragment, and wherein a width of the bounding box is essentially equal to accumulated widths of all glyphs in the text fragment;
    d) calculating the overlapping area of the two bounding boxes; and
    e) determining whether the two candidates form redundant text fragments wherein a ratio of the overlapping area to the area of the smaller bounding box of both text fragments is calculated and this ratio is compared with a predetermined threshold.

* * * * *